United States Patent [19]

Kondow

[11] Patent Number: 4,584,342

[45] Date of Patent: Apr. 22, 1986

[54] LIQUID SILICONE RUBBER COMPOSITION

[75] Inventor: Kiyohiro Kondow, Gunma, Japan

[73] Assignee: Shin-Etsu Chemical Co., Ltd., Japan

[21] Appl. No.: 705,566

[22] Filed: Feb. 26, 1985

[30] Foreign Application Priority Data

Feb. 27, 1984 [JP] Japan .................................. 59-35725

[51] Int. Cl.$^4$ ............................................ C03L 83/04
[52] U.S. Cl. .................................... 524/860; 524/868; 524/869; 525/476; 525/523; 528/33; 528/38; 528/14; 528/21; 528/23
[58] Field of Search ................ 528/38, 33, 14, 21, 528/23; 525/476, 523; 524/860, 868, 869

[56] References Cited

U.S. PATENT DOCUMENTS

| | | | |
|---|---|---|---|
| 4,287,326 | 9/1981 | Mikami | 525/476 |
| 4,311,737 | 1/1982 | Ishizaka et al. | 528/38 |

Primary Examiner—Melvyn I. Marquis
Attorney, Agent, or Firm—Toren, McGeady, Stanger, Goldberg & Kiel

[57] ABSTRACT

A liquid silicone rubber composition comprising (A) an organopolysiloxane containing epoxy groups, (B) an organopolysiloxane containing amino groups and (C) a curing catalyst for epoxy compounds is proposed in which the compounding ratio of the component (A) to the component (B) is in the range of from 0.2 to 5.0 relative to the epoxy/amino molar ratio and which further contains optionally an organic solvent such as xylene and a silica flour. The composition is cured rapidly without the problem of catalyst poisoning even at room temperatures to be converted into a cured article with low volume resistivity and excellent antistatic performance as well as surface releasability. The composition is useful as casting materials, electric insulating materials, paint vehicles, coating materials, molding compositions and the like.

12 Claims, No Drawings

LIQUID SILICONE RUBBER COMPOSITION

BACKGROUND OF THE INVENTION

The present invention relates to a liquid silicone rubber composition or, more particularly, to a liquid silicone rubber composition which can be rapidly cured into a rubbery elastomer without being accompanied by the problem of catalyst poisons. The composition is used in a wide variety of applications such as casting materials, electric insulators, paints, coating materials, molding materials compositions the like.

There are several known types of liquid silicone rubber compositions according to the types of the curing reactions including those curable by the condensation reaction, the addition reaction, the vulcanization reaction with admixture of an organic peroxide and the like. There are, however, several problems in the conventional compositions leading to a narrow limitation of applications that the compositions curable by the condensation reaction or the so-called moisture-curable compositions take a long time of one day or more to be fully cured even when the shaped articles to be cured has a relatively small thickness of 1 mm or so although they can be cured advantageously even at room temperature and that the platinum catalyst used in the compositions curable by the addition reaction is subject to poisoning although such a composition can be cured within a relatively short time by heating. Also, the compositions of the peroxide-vulcanizable type can be cured in a short time by heating but have a disadvantage that the curing reaction is under a retarding effect of atmospheric oxygen so that curing is sometimes incomplete in the surface layer of the spaped article.

SUMMARY OF THE INVENTION

An object of the present invention is therefore to provide a liquid silicone rubber composition without the abovementioned disadvantages and problems in the conventional liquid silicone rubber compositions.

The liquid silicone rubber composition of the invention comprises:

(A) a first organopolysiloxane having, in a molecule, at least two epoxy groups and represented by the average unit formula $$R^1_a R^2_b SiO_{\frac{4-a-b}{2}}, \quad (I)$$

in which $R^1$ is a hydrogen atom, a hydroxy group or a monovalent organic group having 1 to 9 carbon atoms each $R^1$ independently from the others in the same molecule, $R^2$ is a group having an epoxy ring structure selected from the class consisting of those expressed by the formulas of:

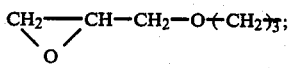

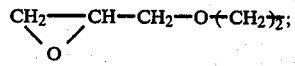

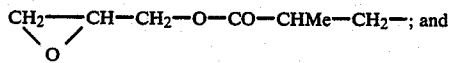

Me being a methyl group, the suffix a is a positive number not exceeding 4 and the suffix b is a positive number not exceeding 1 with the proviso that a+b is in the range from 1.8 to 3.0;

(B) a second organopolysiloxane having at least two amino groups in a molecule represented by the average unit formula $$R^3_c R^4_d SiO_{\frac{4-c-d}{2}}, \quad (II)$$

in which $R^3$ is a hydrogen atom, a hydroxy group or a monovalent organic group having 1 to 9 carbon atoms each $R^3$ independently from the others, $R^4$ is a 3-aminopropyl group of the formula $NH_2\text{-}(CH_2)_3$ or a 3-(2-aminoethylamino)propyl group of the formula $NH_2\text{-}(CH_2)_2NH\text{-}(CH_2)_3$, the suffix c is a positive number not exceeding 4 and the suffix d is a positive number not exceeding 1 with the proviso that c+d is in the range from 1.8 to 3.0; and (C) a curing catalyst for epoxy compounds.

DETAILED DESCRIPTION OF THE PREFERRED EMBODIMENTS

As the outcome of the extensive investigations undertaken with an object to improve the quality of liquid silicone rubber compositions, the inventors have completed the present invention on the basis of the discovery that a composition comprising an organopolysiloxane having epoxy groups as represented by the average unit formula (I) and an organopolysiloxane having amino groups as represented by the average unit formula (II) cures within a short time either at room temperature or at an elevated temperature in the presence of a curing catalyst for epoxy compounds, that there are no problems such as catalyst poisoning, oxygen inhibition and the like, that shaped articles with higher dimensional accuracy can be produced owing to the absence of any byproduct produced in the course of the curing process and, furthermore, that uniform curing of articles of any large size formed by casting is obtained even in the depth of the body owing to the high velocity of curing by virtue of the utilization of the generated heat of reaction between the epoxy and the amino groups in the course of the curing process for the acceleration of curing itself, that the cured articles having a hardness of as high as 80 by the JIS scale can be easily obtained from a gel-like mass even in the absence of added fillers and that the shaped and cured rubber articles of the composition have a low volume resistivity of, for example, $10^{10}$ to $10^{12}$ ohm.cm and are excellent in the properties such as antistatic performance and surface releasability.

The organopolysiloxane as the component A) forming the composition of the present invention is, as is mentioned above, represented by the average unit formula (I), in which $R^1$ is an atom or a group selected from the class consisting of a hydrogen atom, a hydroxy group, monovalent organic groups having 9 or less of carbon atoms exemplified by alkyl groups such as methyl, ethyl, propyl and butyl groups, alkenyl groups such as vinyl and allyl groups, aryl groups such as phenyl group and those substituted groups obtained by replacing all or a part of the hydrogen atoms bonded to the carbon atoms in the above named hydrocarbon groups with substituent atoms or groups such as halogen atoms and cyano groups exemplified by chloromethyl, 3,3,3-trifluoropropyl and the like groups as well as alkoxy groups such as methoxy, ethoxy and propoxy groups. The groups denoted by $R^1$ in a molecule of the organopolysiloxane can be selected each independently from the others. The groups denoted by $R^2$ is, as is mentioned before, a specific epoxy-containing organic group expressed by either one of the above given structural formulas. The suffixes a and b are each a positive number not exceeding 4 and 1, respectively, with the proviso that $a+b$ is in the range from 1.8 to 3.0. It is essential that the organopolysiloxane as the component (A) contains at least two epoxy groups in a molecule. Exemplary of such epoxy-containing organopolysiloxanes are those expressed by the fol-lowing formulas, denoting a methyl, an octyl, a phenyl, a 3-glycidyloxypropyl and a 1,2-epoxycyclohexyl group with the symbols Me, Ph, Oc, $G^1$ and $G^2$, respectively:

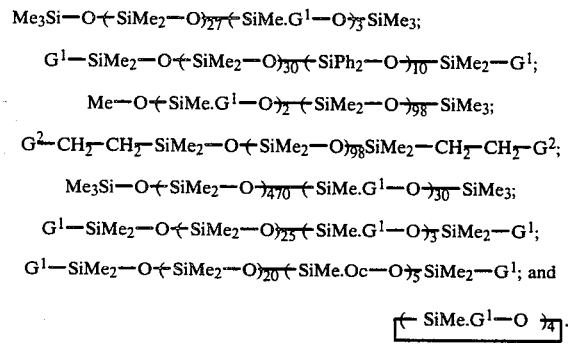

The molecular configuration of the organopolysiloxanes may be either linear or cyclic and the introduction of limited number of side chains thereinto is also optional provided that the viscosity of the organopolysiloxanes at 25° C. is preferably in the range from 5 to 100,000 centistokes or, more preferably, from 50 to 10,000 centistokes since the composition should be liquid and have a workable consistency at room temperature. Such organopolysiloxanes can be prepared by an equilibration reaction between an alkoxysilane or a low molecular siloxane such as disiloxanes, trisiloxanes, tetrasiloxanes and the like each containing one or more of epoxy groups and a dimethylpolysiloxane according to the conventional method or by the cohydrolysis of corresponding hydrolyzable organosilanes. Small amounts of residual alkoxy groups, silanol groups, halogen atoms and the like may be contained in the organopolysiloxane produced using these starting materials since these groups and atoms have no substantially adverse influences on the curing reaction of the inventive composition.

The second organopolysiloxane as the component B) of the inventive composition, on the other hand, is represented by the average unit formula (II), in which $R^3$ may be the same group as those denoted by $R^1$ aforementioned, $R^4$ is either a 3-aminopropyl or a 3-(2-aminoethyl)aminopropyl group, the suffixes of c and d are each a positive number not exceeding 4 and 1, respectively, with the proviso that $c+d$ is in the range from 1.8 to 3.0. It is essential that the organopolysiloxane contains at least two amino groups in a molecule.

Exemplary of such organopolysiloxanes containing amino groups are, denoting a 3-aminopropyl and 3-(2-aminoethyl)aminopropyl group with the symbols of $A^1$ and $A^2$, respectively, the other symbols each having the same meaning as defined before:

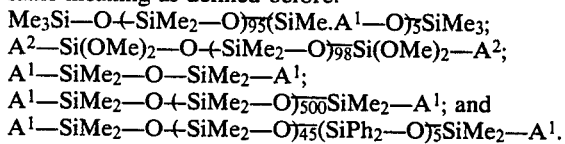

The molecular configuration of these organopolysiloxanes may be either linear or cyclic and introduction of a small number of side chains thereinto has no particularly adverse influ-ences provided that the viscosity of the organopolysiloxane at 25° C. is preferably in the range from 5 to 100,000 centistokes or, more preferably, from 50 to 10,000 centistokes in order that the composition should be liquid and have a workable consistency at room temperature. Such organopolysiloxanes are prepared in a method similar to the method for the preparation of the epoxy-containing organopolysiloxanes as the component (A) by the equilibration reaction between a corresponding amino-containing alkoxysilane or low molecular siloxane such as disiloxanes, trisiloxanes, tetrasiloxanes and the like and a dimethylpolysiloxane according to the conventional method or by the cohydrolysis of corresponding hydrolyzable organosilanes. Small amounts of residual alkoxy groups, silanol groups, halogen atoms and the like originating in these starting materials may be contained in the organopolysiloxane without particular adverse influences.

The composition of the present invention is prepared by adding a curing catalyst for epoxy compounds as the component (C) to the combination of the epoxy-containing organopolysiloxane as the component (A) and the amino-containing organopolysiloxane as the component (B), while the curing catalyst for epoxy compounds used in this preparation may be selected from any known catalytic compounds as exemplified by aliphatic tertiary amines such as tributylamines and the like, imidazole compounds such as phenyl imidazole and the like, tertiary phosphine compounds such as triphenylphosphine and the like, quaternary ammonium salts and trifluoroboron complex salts. Among the above named catalytic compounds, the tertiary amines, imidazole compounds and phosphine compounds are advantageously used since the trifluoroboron compounds sometimes cause difficulty due to rusting according to the manner of application or the material of the substrate and the quaternary ammonium salts are difficultly imparted with solubility. The amount of the catalyst in the inventive composition should preferably be in the range from 0.01 to 10% by weight or, more preferably, in the range from 0.1 to 5% by weight based on the total amount of the compo-nents (A) and (B).

The composition of the present invention can be obtained simply by mixing the above-mentioned components (A), (B) and (C) uniformly in a suitable blending machine. It is desirable that the viscosity of the mixture of these three components at 25° C. in order that the composition is workable as a liquid. The three components are storable as a ready-mixed blend of the three components in one package or in two or three separate packages each containing one or two of the components according to need, the contents of which should be mixed together directly before use of the inventive composition. In the case of a ready-mixed blend stored in one package, it is sometimes necessary to keep the composition as mixed at a low temperature or to select a curing catalyst which is active only at an elevated temperature. Since the three components should necessarily be miscible with each other to form a uniform mixture, it is sometimes recommendable to perform compounding of the components at an elevated temperature or to use an organic solvent having a dissolving power for the components when the components have no sufficient compatibility with each other to ensure ready and homogeneous mixing. An effective method is the pre-heating treatment of a pre-mix of the epoxy-containing organopolysiloxane and the eopxy curing catalyst.

The blending ratio of the epoxy-containing organopolysiloxane as the component (A) and the amino-containing organopolysiloxane as the component (B) is preferably in such a range that the molar ratio of the epoxy groups to the amino groups contained in the components (A) and (B), respectively, is in the range from 0.2 to 5.0 or, more preferably, from 0.8 to 2.5 in consideration of the curability of the composition and the characteristics of the cured product. The ratio of the contents of these two types of the functional groups is desirably as close as possible to equimolar from the standpoint of obtaining a better compatibility of the organopolysiloxanes in the course of mixing and, when the ratio is markedly larger or smaller than equimolar, difficulties are sometimes encountered in obtaining a uniform mixture of the organopolysiloxanes and, even when a uniform composition is once obtained, phase separation may take place even under heating so that curing of such an inhomogeneous composition gives a cured product having markedly low strengths. A composition in which phase separation has taken place can be rapidly cured by diluting the composition with a small amount of an organic solvent such as a hydrocarbon solvent, e.g. xylene, and the like. A preferable combination of the epoxy and amino groups as the functional groups is obtained by the formulation with a multi-functional eopxy-containing organopolysiloxane and a difunctional amino-containing organopolysiloxane. Combinations of a high-polymeric epoxy-containing organopolysiloxane and an amino-containing organopolysiloxane having a relatively low degree of polymerization are also preferable because sufficient compatibility can be obtained even when the compounding ratio of these two organopolysiloxanes is widely apart from equimolar relative to the contents of the epoxy and amino groups.

The composition according to the present invention can be cured even at room temperature. Because of the exothermic nature of the reaction, curing is autogenously accelerated by the heat of reaction although an outer heating means is preferably undertaken to increase the temperature to, for example, 70° to 150° C. when further acceleration of curing is desired. Final cured products are easily obtained by heating the composition in this manner for 1 to 20 hours.

The cured articles thus obtained may have a volume resistivity varied in a wide range, and, for example, a cured article having a volume resistivity as low as $10^{10}$ to $10^{12}$ ohm.cm can be obtained. Such compositions are useful as a coating material suitable for a wide variety of applications since they give cured products with a short attenuation time of the electrostatic charge and an excellent antistatic characteristic. In addition, the inventive composition may be converted into a transparent cured product having a high hardness as high as 85 in the JIS scale or into a coating film having a surface releasability of heavy duty grade when cured after application to paper or other substrates.

In addition to the above described essential components (A) to (C) merely blended together to form the inventive composition, furthermore, a wide variety of conventional additives may be added to the composition including fillers, pigments, plasticizers, solvents and others known as the ingredients in silicone rubbers so that the application fields of the inventive composition can be broadened to include casting materials, electric insulating materials, paints, coating materials, molding compositions and the like.

In the following, the liquid silicone rubber composition of the invention is illustrated in more detail by way of examples, in which the values of viscosities are all the values obtained by the measurement at 25° C.

EXAMPLES 1 TO 3

In each of these Examples, a composition was prepared by admixing 1,3-di(3-aminopropyl)-1,1,3,3-tetramethyl disiloxane, referred to as aminosiloxane B-1 hereinbelow, in an amount indicated in Table 1 below with one of the epoxy-containing organopolysiloxanes A-1 (Example 1), A-2 (Example 2) and A-3 (Example 3) of the formulas shown below in an amount also indicated in Table 1 followed by the admixture of 2-ethyl-4-methylimidazole as the curing catalyst in an amount of 0.5% by weight based on the total amount of the two types of the organopolysiloxanes. The miscibility of the components was good in each formulation to give a clear mixture. Curing of each of these compositions by heating for 4 hours at 100° C. gave a transparent cured body of which the hardness and volume resistivity were determined to give the respective results shown in Table 1.

Epoxy-containing organopolysiloxanes

A-1: $Me_3Si-O+SiMe_2-O)_{80}(SiMe.G^1-O)_{55}SiMe_3$ having a viscosity of 2000 centistokes and an epoxy equivalent of 350

A-2: $Me_3Si-O+SiMe_2-O)_{10}(SiMe.G^1-O)_{5}SiMe_3$ having a viscosity of 1000 centistokes and an epoxy equivalent of 330

A-3: $Me_3Si-O+SiMe_2-O)_{900}(SiMe.G^1-O)_{20}SiMe_3$ having a viscosity of 20,000 centistokes and an epoxy equivalent of 4000

TABLE 1

| Example No. | Organopolysiloxanes taken, g | | | | Properties of cured products | |
|---|---|---|---|---|---|---|
| | Epoxy-siloxane | | Amino-siloxane | | Hardness, JIS | Volume resistivity ohm · cm |
| 1 | A-1 | 35.0 | B-1 | 12.4 | 85 | $3 \times 10^{10}$ |
| 2 | A-2 | 33.0 | B-1 | 12.4 | 67 | $1 \times 10^{11}$ |
| 3 | A-3 | 40.0 | B-1 | 1.24 | 25 | $8 \times 10^{12}$ |

EXAMPLES 4 TO 7 AND COMPARATIVE EXAMPLE 1

In each of these Examples, a composition was prepared by admixing 12.4 g of the amino-containing organopolysiloxane B-1 with an epoxy-containing organopolysiloxane, referred to as epoxysiloxane A-4 hereinbelow, expressed by the formula Me₃Si—O—SiMe₂—O)₂₇(SiMe.G¹—O)₃SiMe₃ in a varied amount indicated in Table 2 below followed by the addition of 2-phenylimidazole as the curing catalyst in an amount of 1% by weight based on the total amount of the two types of the organopolysiloxanes. The miscibility of the components was good in each formulation to give a clear mixture.

After curing of each of the compositions by heating for 10 hours at 70° C., the hardness of the cured products was determined to give the results shown in Table 2. No cured product could be obtained of the composition prepared in Comparative Example 1.

EXAMPLE 8

A composition was prepared by blending 5.3 g of the epoxycontaining organopolysiloxane A-1 used in Example 1, 16.7 g of an amino-containing organopolysiloxane, referred to as aminosiloxane B-2 hereinbelow, expressed by the formula

A²—SiMe.OMe—O-(-SiMe₂—O)₄₀SiMe.OMe—A² and 0.22 g of triphenylphosphine as the curing catalyst. The composition was cloudy as a whole and did not cure even after heating for 20 hours at 70° C. while a clear mixture was obtained of the cloudy composition by adding 5.0 g of xylene and this clear composition could be cured by heating at 70° C. for 20 hours to give a uniform cured product.

TABLE 2

| | Organopolysiloxanes taken | | | |
|---|---|---|---|---|
| | Epoxy-siloxane A-4, g | Amino-siloxane B-1, g | Epoxy/amino molar ratio | Hardness, JIS |
| Example No. | | | | |
| 4 | 45.0 | 12.4 | 0.5 | 13 |
| 5 | 90.0 | 12.4 | 1.0 | 40 |
| 6 | 180.0 | 12.4 | 2.0 | 20 |
| 7 | 360.0 | 12.4 | 4.0 | 5 |
| Comparative Example | | | | |
| 1 | 540.0 | 12.4 | 6.0 | (gelled) |

EXAMPLES 9 TO 11

Compositions were prepared each by blending the amino-containing organopolysiloxane B-1 used in Example 1 in a varied amount indicated in Table 3, each 75 g of the epoxy-containing organopolysiloxane A-1 used in Example 1 (Examples 9 and 10) or A-4 used in Examples 4 to 7 (Example 11) and a 2-ethyl-4-methylimidazole as the curing catalyst in an amount indicated in Table 3 along with or without a silica flour having a specific surface area of 7 m²/g in an amount also indicated in Table 3. Each of these compositions was cured by heating for 5 hours at 100° C. to give a cured product of which several properties were measured to give the results shown in Table 3. For comparison, the 50% electrostatic attenuation time was also determined of a cured product of the commercial liquid silicone rubber composition (KE 1204, a product by Shin-Etsu Chemical Co.) curable by the addition reaction to give a result of 5 minutes.

TABLE 3

| | Example No. | 9 | 10 | 11 |
|---|---|---|---|---|
| Formulation | Epoxy-siloxane, g | A-1 75 | A-1 75 | A-4 75 |
| | Amino-siloxane, g | B-1 25 | B-1 25 | B-1 7.5 |
| | Curing catalyst, g | 0.5 | 0.5 | 0.4 |
| | Silica flour, g | — | 100 | 82.5 |
| Properties of cured products | Appearance | Clear | White | White |
| | Specific gravity | 1.04 | 1.50 | 1.50 |
| | Hardness, JIS | 78 | 90 | 64 |
| | Tensile strength kg/cm² | 20 | 50 | 20 |
| | at 1 KHz | 4.9 | 4.8 | 3.7 |
| | at 1 KHz | 0.005 | 0.01 | 0.009 |
| | Volume resistivity, ohm.cm | 7 × 10¹⁰ | 2 × 10¹¹ | 5 × 10¹² |
| | 50% attenuation time of electrostatic charge, seconds | 3 | 3 | 3 |
| | Tape peeling | 300 | 550 | 50 |

*The force required for peeling off a craft tape of 5 cm width after pressing down

What is claimed is:
1. A liquid silicon rubber composition which comprises:
(A) a first organopolysiloxane having at least two epoxy groups in a molecule represented by the average formula

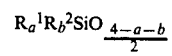

$$R_a^1 R_b^2 SiO_{\frac{4-a-b}{2}}$$

in which R¹ is an atom or a group selected from the group consisting of a hydrogen atom, a hydroxy group and a monovalent organic group having 1 to 9 carbon atoms, R² is an epoxy-containing group selected from the group consisting of the groups expressed by the formula of

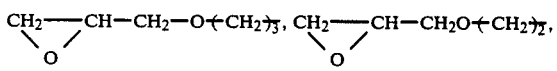

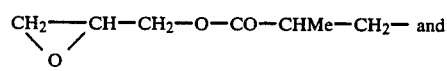

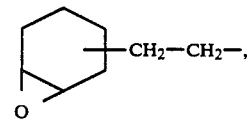

Me being a methyl group, the suffix a is a positive number not exceeding 4 and the suffix b is a positive number not exceeding 1 with the proviso that a+b is in the range from 1.8 to 3.0;
(B) a second organopolysiloxane having at least two amino groups in a molecule represented by the average unit formula

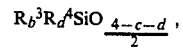

$$R_b^3 R_d^4 SiO_{\frac{4-c-d}{2}},$$

in which R³ is a hydrogen atom, a hydroxy group or a monovalent organic group having 1 to 9 carbon atoms, R⁴ is a 3-aminopropyl group of the formula NH₂-(-CH₂-)₃ or a 3-(2-amino-ethylamino)propyl group of the formula NH₂-(-CH₂-)₂NH-(CH₂-)₃, the suffix c is a positive number not exceeding 4 and the suffix d is a positive number not exceeding 1 with the proviso that c+d is in the range from 1.8 to 3.0, and (C) a curing catalyst for epoxy compounds selected from the group consisting of aliphatic tertiary amines, imidazoles, tertiary phosphines, quaternary ammonium salts and trifluoroboron complex salts, the proportion of the amounts of the components (A) and (B) being such that the molar ratio of the epoxy groups in the component (A) to the amino groups in the component (B) is in the range from 0.2 to 5.0.

2. The liquid silicone rubber composition as claimed in claim 1 wherein the monovalent organic group denoted by $R^1$ is selected from the group consisting of substituted and unsubstituted alkyl groups, alkenyl groups, aryl groups and alkoxy groups.

3. The liquid silicone rubber composition as claimed in claim 1 wherein the monovalent organic group denoted by $R^3$ is selected from the group consisting of substituted and unsubstituted alkyl groups, alkenyl groups, aryl groups and alkoxy groups.

4. The liquid silicone rubber composition as claimed in claim 1 wherein the first organopolysiloxane containing epoxy groups has a viscosity in the range from 5 to 100,000 centistokes at 25° C.

5. The liquid silicone rubber composition as claimed in claim 1 wherein the second organopolysiloxane containing amino groups has a viscosity in the range from 5 to 100,000 centistokes at 25° C.

6. The liquid silicone rubber composition as claimed in claim 1 wherein the proportion of the amounts of the components (A) and (B) is such that the molar ratio of the epoxy groups in the component (A) to the amino groups in the component (B) is in the range from 0.8 to 2.5.

7. The liquid silicone rubber composition as claimed in claim 1 wherein the curing catalyst for epoxy compounds is selected from the class consisting of tributylamines, phenylimidazoles, 2-ethyl-4-methyl imidazole and triphenylphosphine.

8. The liquid silicone rubber composition as claimed in claim 1 wherein the amount of the component (C) is in the range from 0.01% to 10% by weight based on the total amount of the components (A) and (B).

9. The liquid silicone rubber composition as claimed in claim 8 wherein the amount of the component (C) is in the range from 0.1% to 5% by weight based on the total amount of the components (A) and (B).

10. The liquid silicone rubber composition as claimed in claim 1 which further comprises an organic solvent added thereto.

11. The liquid silicone rubber composition as claimed in claim 10 wherein the organic solvent is selected from hydrocarbon solvents.

12. The liquid silicone rubber composition as claimed in claim 1 which further comprises a silica flour added thereto.

* * * * *